Oct. 30, 1962 L. SCHMIDT 3,060,621
FISHING LINE FLOAT
Original Filed April 2, 1953
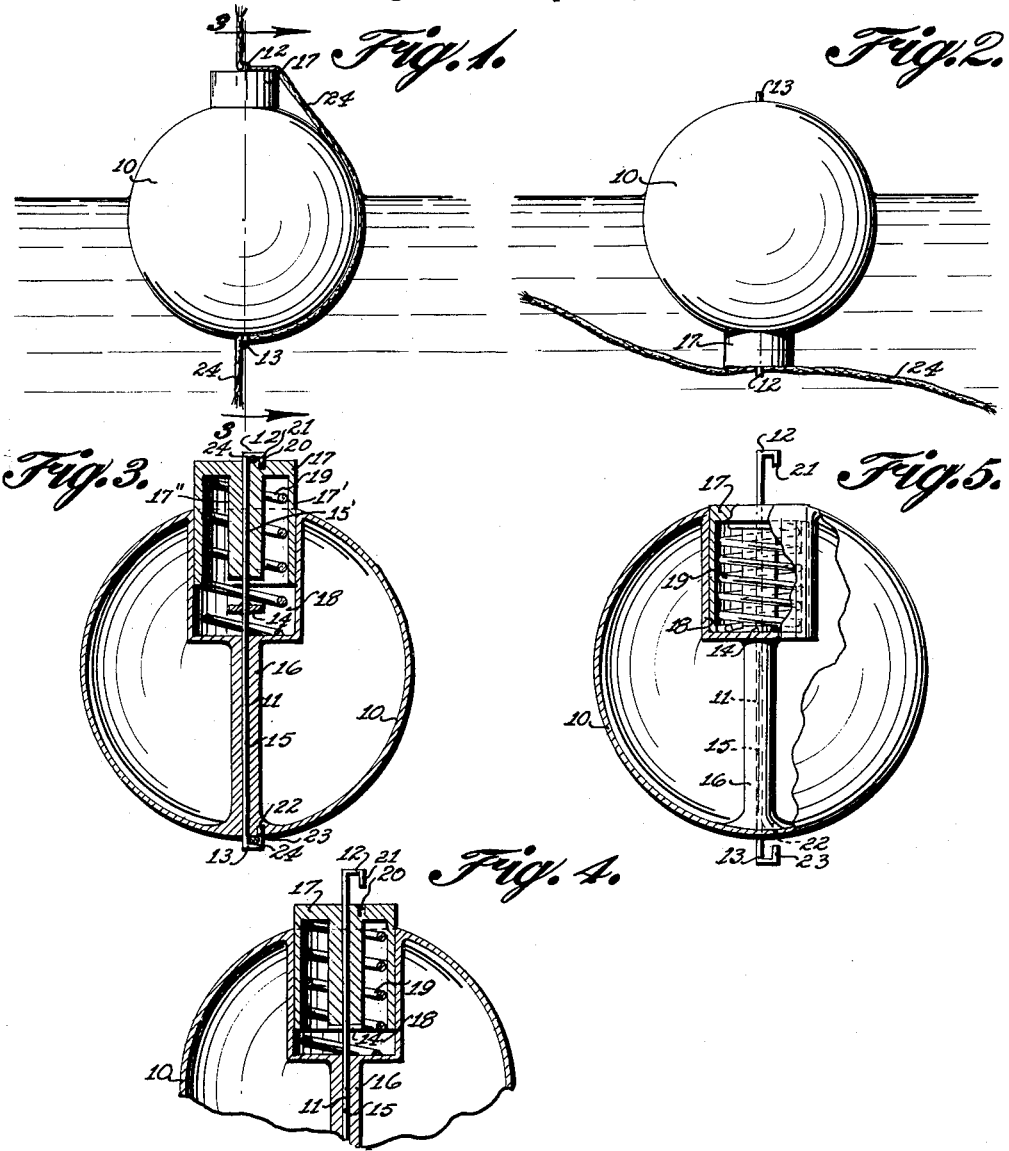
INVENTOR.
Ludwig Schmidt.
BY Victor J. Evans & Co.
ATTORNEYS

United States Patent Office 3,060,621
Patented Oct. 30, 1962

3,060,621
FISHING LINE FLOAT
Ludwig Schmidt, % Master Products Co.,
Montague, Mich.
Continuation of application Ser. No. 346,385, Apr. 2, 1953. This application Oct. 23, 1956, Ser. No. 618,167
2 Claims. (Cl. 43—44.95)

This application is a continuation of my copending application Serial No. 346,385, filed April 2, 1953, and now abandoned.

This invention relates to floats for fishing lines, and in particular a float in which positive line holding means is provided at both ends of the float and in which the holding means includes a spring actuated plunger for urging the fishing line into a hook or hooks projecting from the float.

With the fishing line held at both ends of a float a double lock is provided, thereby substantially eliminating slippage and at the same time preventing turning of the float in the water as an angler reels in the line. With a line secured to a float at one point only as in a conventional float the float turns through an angle of 90° when the line is pulled thereby causing wear on the line.

The purpose of this invention is to provide friction holding means, incorporated in a fishing line float or bob wherein a fishing line is positively held at both sides of the float and sliding movement of the line in relation to the float is prevented.

With conventional types of floats, a fishing line passes through eyes, coiled spring wires or other friction holding means and with clamping means of this type it is difficult to prevent slipping of the float on the line. With this thought in mind, this invention contemplates a float in the form of a substantially hollow ball with a rod having hooks on the ends slidably mounted in and extended from opposite sides of the ball, and a spring actuated plunger slidably mounted in one side of the ball and positioned around the rod whereby with a line held by a hook on one end of the rod the plunger urges the line against a hook on the opposite end.

The object of this invention, is therefore, to provide means for frictionally holding a fishing line on both sides of a float wherein the postion of the float on the line is manually adjustable.

Another object of the invention is to provide an improved connection for retaining a float on a fishing line wherein the float remains in position on the line until it is actuated manually to move the line on the float.

A further object of the invention is to provide an improved means for frictionally holding a fishing line at both side of a float in which the holding means is of a simple and economical construction.

With these and other objects and advantages in view, the invention embodies a substantially hollow member having a passage extended therethrough with a rod having hooks on the ends and a collar intermediate of the ends slidably mounted in the passage and with a plunger having a spring therein positioned in a cylinder formed with a counterbore at one end of the passage.

Other features and advantages of the invention will appear from the following description taken in connection with the drawing, wherein:

FIGURE 1 is a side elevational view illustrating the position of the float in the water with a fishing line secured to the upper and lower ends thereof.

FIGURE 2 is a side elevational view similar to that shown in FIG. 1 showing the fishing line attached to one side of the float and with the sides of the float to which the fishing line is attached extended downwardly.

FIGURE 3 is a cross section taken on line 3—3 of FIG. 1 showing the construction of the float.

FIGURE 4 is a detail showing a section through the upper part of the float, similar to that shown in FIG. 3, and showing the plunger in partially depressed position.

FIGURE 5 is an elevational view, substantially similar to that shown in FIGS. 1 and 3 with parts broken away and showing the plunger completely compressed wherein the hooks at both ends of the float are free.

Referring now to the drawing wherein like reference characters denote corresponding parts, the improved fishing line float of this invention includes a substantially hollow buoyant body 10 provided with an internal post 16 extending diametrically through the body along an axis adapted to be disposed in an upright position when the body is buoyantly supported. The post is formed with an axial passageway 15 extending therethrough, and one end portion of the passageway in the post is enlarged to form a cylindrical recess 18. A plunger 17 is formed with an outer portion 17' providing a surface for slidably engaging the surface of the recess 18 for reciprocating movement therein and an inner portion 17" substantially coextensive longitudinally therewith is provided with a passageway 15' extending longitudinally therethrough. The passageway 15' in the inner portion is in alignment with the passageway 15 in the post 16. A line locking means such as a bar 11 extends slidably through the passageways 15 and 15' and is bent over to form a hook 12 at one end and a hook 13 at its opposite end. In order to control the line locking means to afford a double line lock, stop means are provided. For example, secured to the bar 11 intermediate its ends and positioned within the recess 18 between the bottom wall thereof and the inwardly disposed end of the inner portion 17" of the plunger 17 is a collar or stop member 14 adapted to cooperate with the plunger 17 and bottom wall of the recess 18 to provide a lost motion means for successively exposing the hooks 12 and 13 as hereinafter described. A coil spring 19 is seated at one end against the bottom wall of the recess 18 and at its opposite end in the space provided between the inner and outer portions of the plunger 17, whereby the plunger is biased outwardly in relation to the float body 10 to tension the bar 11.

It will be understood that although the float is illustrated as being round or in the form of a ball, the body thereof may be of any suitable shape. It will also be understood that the plunger may be of any suitable shape or size.

In the design shown the end of the plunger 17 is provided with an opening 20 that is positioned to receive an extended end 21 of the hook 12 and a similar opening 22 is provided at the opposite side of the body for receiving the projection 23 of the hook 13.

With the parts arranged in this manner, a fishing line, as indicated by the numeral 24, is threaded through the hooks preferably with the parts in the positions shown in FIG. 5 whereby the line is threaded through the hook 13 and with the rod or bar 11 drawn into the body, to the position shown in FIG. 3, the line is gripped by the hook 13 while it is threaded through the hook 12 and after passing through the hook 12 the plunger 17 is released whereby the plunger grips the line in the hook 12, as shown in FIG. 3.

The fishing line may readily be released from the hook at either side of the float by pressing the hook on one side inwardly until the hook at the opposite side extends from the float and, as shown in FIG. 3, the rod 11 is provided with a collar 14 that engages one end of the cylinder 18 to limit the travel of the rod.

The space between the end of the cylinder 18 and the plunger 17 in which the collar 14 is interposed prescribes the limits of a "lost motion" connection between the relatively axially telescoped parts provided by the hollow ball 10 and the plunger 17 and the rod 11. Thus, when the plunger 17 is initially actuated by pushing the plunger 17 into the recess provided by the cylinder 18, the rod 11 moves concurrently therewith to expose the hook 13 on the end of the rod 11, whereupon the collar 14 on the rod 11 engages the end of the cylinder 18 and further movement of the plunger 17 inwardly into the cylinder 18 produces a movement relative to the rod 11 to thereafter expose the hook 12.

With the parts arranged in this manner, the plunger may be pressed inwardly to release the fishing line or to adjust the position thereof and the plunger may also be depressed to facilitate threading the line through the float.

By this means a float may readily be attached to a fishing line and frictionally held at both sides or at the top and bottom of the float and by pressing the plunger 17 inwardly the line may be released from either side, for example, the side on which the plunger is positioned and by continuing the movement of the plunger the inner portion 17" engages a collar 14 whereby the hooks at the opposite side may also be moved outwardly so that with the plunger depressed to the position shown in FIG. 5 the line is released from the hooks at both sides of the float.

It will be understood that modifications, within the scope of the appended claims, may be made in the design and arrangement of the parts without departing from the spirit of the invention.

I claim as my invention:

1. A fishing line float comprising, a body having outer wall means enclosing a space to provide the float with buoyancy, said body having an internal post portion extending through the inside of said body on an axis adapted to be positioned uprightly when the float is buoyantly supported, said post having a through passageway formed therein having open ends at opposite sides of said body, one end of said passageway being enlarged inside of said body to form a generally cylindrical recess, a plunger reciprocably slidable in said cylindrical recess and having an axially extending through passageway formed therein, a coil spring in said recess having one end abutting said plunger and urging said plunger outwardly of said body, bar means extending slidably through said passageway of said post and through said axially extending passageway of said plunger and having a hook formed on each end thereof engaged with said plunger and said body, respectively, and stop means on said bar means positioned within said cylindrical recess and being located between the end of said recess and the adjacent end of said plunger for successive engagement with said plunger and the post at the end of said recess to successively expose first one hook upon initial depression of said plunger and then the other hook upon continued depression of said plunger into the recess, said plunger having inner and outer portions of substantially coextensive longitudinal extent, the outer portion of said plunger providing a surface for slidably engaging the wall of said recess, the inner portion of said plunger providing abutment means at said adjacent end of said plunger for engaging said stop means and providing lateral support along a substantial length of the bar means.

2. A fishing float comprising buoyant means providing a pair of longitudinally separable spring-loaded telescopically related parts having a passage formed therein and extending longitudinally therethrough on the axis of relative movement, one of said parts comprising a float body having a recess formed in one side thereof and forming a part of said passage, the other part comprising a plunger slidable in said recess, and bar means consisting of a wire form member having laterally offset reversely bent end portions overlying the edges of said parts at opposite ends of said passage to limit the separation of said parts, said edges of said parts having recess means formed therein adjacent said passage receiving and seating corresponding offset end portions of said wire form member, thereby to clamp a fishing line inserted between said end portions and said edges, said parts being selectively depressible against the spring bias to selectively shorten said passage to a dimension less than the length of said wire form member between said bent end portions, and stop means on said wire form member and operatively interposed between said parts for successive engagement with said parts whereupon first one of said hooks will be exposed upon initial depression of said parts and then the other of said hooks will be exposed upon continued depression of said parts, said plunger having inner and outer portions of substantially coextensive longitudinal extent, the outer portion of said plunger providing a surface for slidably engaging the wall of said recess, the inner portion of said plunger providing rigid lateral support along a substantial length of said wire form member.

References Cited in the file of this patent

UNITED STATES PATENTS

| | | |
|---|---|---|
| 575,674 | Woodward | Jan. 19, 1897 |
| 2,645,832 | Lee | July 21, 1953 |
| 2,670,560 | Matras | Mar. 2, 1954 |
| 2,706,869 | Shoenfelt | Apr. 26, 1955 |
| 2,767,506 | Robinson | Oct. 23, 1956 |